Nov. 29, 1955    J. G. O'NEIL    2,725,001
METHOD AND APPARATUS FOR PRODUCING CONTAINERS
Filed Oct. 25, 1950    12 Sheets-Sheet 1

FIG 1

INVENTOR.
JOHN G. O'NEIL
BY
Chas. C. Reif
ATTORNEY.

Nov. 29, 1955   J. G. O'NEIL   2,725,001
METHOD AND APPARATUS FOR PRODUCING CONTAINERS
Filed Oct. 25, 1950   12 Sheets-Sheet 2

INVENTOR.
JOHN G. O'NEIL
BY
Chas. C. Reif
ATTORNEY.

Nov. 29, 1955 — J. G. O'NEIL — 2,725,001
METHOD AND APPARATUS FOR PRODUCING CONTAINERS
Filed Oct. 25, 1950 — 12 Sheets-Sheet 5

INVENTOR.
JOHN G. O'NEIL
BY Chas. C. Reyf
ATTORNEY.

Nov. 29, 1955   J. G. O'NEIL   2,725,001
METHOD AND APPARATUS FOR PRODUCING CONTAINERS
Filed Oct. 25, 1950   12 Sheets-Sheet 6

INVENTOR
JOHN G. O'NEIL
BY Chas. E. Reif
ATTORNEY

Nov. 29, 1955  J. G. O'NEIL  2,725,001

METHOD AND APPARATUS FOR PRODUCING CONTAINERS

Filed Oct. 25, 1950  12 Sheets-Sheet 7

INVENTOR.
JOHN G. O'NEIL
BY Chas. C. Reyf
ATTOREY.

Nov. 29, 1955           J. G. O'NEIL           2,725,001

METHOD AND APPARATUS FOR PRODUCING CONTAINERS

Filed Oct. 25, 1950           12 Sheets-Sheet 8

INVENTOR.
JOHN G. O'NEIL
BY Chas. C. Reif
ATTORNEY.

Nov. 29, 1955   J. G. O'NEIL   2,725,001
METHOD AND APPARATUS FOR PRODUCING CONTAINERS
Filed Oct. 25, 1950   12 Sheets-Sheet 9

Inventor
JOHN G. O'NEIL
By Chas. C. Reif
Attorney

Nov. 29, 1955  J. G. O'NEIL  2,725,001
METHOD AND APPARATUS FOR PRODUCING CONTAINERS
Filed Oct. 25, 1950  12 Sheets-Sheet 10

INVENTOR.
JOHN G. O'NEIL
BY Chas. C. Reif.
ATTORNEY.

Nov. 29, 1955     J. G. O'NEIL     2,725,001

METHOD AND APPARATUS FOR PRODUCING CONTAINERS

Filed Oct. 25, 1950     12 Sheets-Sheet 11

INVENTOR.
JOHN G O'NEIL
BY Chas. C. Reif
ATTORNEY

Nov. 29, 1955 J. G. O'NEIL 2,725,001
METHOD AND APPARATUS FOR PRODUCING CONTAINERS
Filed Oct. 25, 1950 12 Sheets-Sheet 12

INVENTOR.
JOHN G. O'NEIL
BY
Chas. C. Reif.
ATTORNEY.

United States Patent Office 2,725,001
Patented Nov. 29, 1955

2,725,001

METHOD AND APPARATUS FOR PRODUCING CONTAINERS

John G. O'Neil, Minneapolis, Minn., assignor to Weinon Corporation, St. Paul, Minn., a corporation of Minnesota Application October 25, 1950, Serial No. 191,967

21 Claims. (Cl. 93—39.2)

This invention relates to a method and apparatus for making a container. While different shapes of containers could be made, in the embodiment of the invention illustrated the method and apparatus is used to make a cylindrical container. It has long been desired in the art to have a method and apparatus which would produce a round container of accurate and uniform dimensions and to have a method and apparatus which would produce such containers at a rapid rate. It has also been desired to have a method and apparatus which would make a container with perfectly sealed joints and one which is entirely waterproof.

It is an object of this invention therefore to provide a method and apparatus for accurately and rapidly producing a container of accurate and uniform dimensions and having a closed end.

It is another object of the invention to provide a method and apparatus for producing a container of accurate and uniform dimensions in which the blank of the container is wrapped about a mandrel so that the edges of said blank overlap and are sealed, preferably by electrical means, a bottom being placed on said container which is crimped and sealed thereon.

It is also an object of the invention to provide such a method and apparatus as set forth in the preceding paragraph in which the blank is coated on both sides with a special lacquer which not only renders the container waterproof on its interior and exterior but also acts as the sealing adhesive.

It is still further an object of the invention to provide a method and apparatus in which a plurality of mandrels are carried on a movable table, said table also carrying a wrapping element comprising connected and swinging sections, means for feeding a coated blank between each mandrel and its wrapping element, together with cam means for causing each wrapping element to wrap the blank tightly around its mandrel, together with sealing means for sealing the overlapping portions of the blank when the blank is so folded about its mandrel.

It is another object of the invention to provide such a method and apparatus as set forth in the preceding paragraph, together with means for forming and placing a bottom in the blank as it is wrapped about its mandrel, turning the edge of the container over said bottom, tightly crimping said bottom and the end of the container and sealing said bottom in said container.

Another object of the invention is the provision of a blank coated with a lacquer, together with means for wrapping said blank about a mandrel so as to have overlapping edges, moving an electrode into position to engage said overlapping edges and to heat and seal the same together by said lacquer.

It is more specifically an object of the invention to provide an apparatus for making a container comprising a rotating table, a plurality of mandrels carried on and upstanding from said table in circumferentially spaced relation, a wrapping element carried by said table for each of said mandrels and comprising swinging sections adapted to close substantially tightly about its mandrel, means for placing a blank between said wrapping element and mandrel, means for folding said wrapping element about said mandrel to wrap said blank about said mandrel with overlapping edges, and means for sealing the overlapping edge portions of said blank.

Another object of the invention is to provide such an apparatus as set forth in the preceding paragraph, together with means for forming and placing a bottom in said blank as it is wrapped about said mandrel, turning the end portion of said blank over said bottom, crimping and pressing the blank and bottom portion together, and sealing said bottom portion to said blank.

It is also a further object of the invention to provide such an apparatus as set forth in the two preceding paragraphs, together with a rotating spinning head below each of said mandrels, and means for raising said spinning head to turn over the open end of said container as it is on its mandrel.

These and other objects and advantages of the invention will be fully set forth in the following description made in connection with the accompanying drawings in which like reference characters refer to similar parts throughout the several views and in which.

Figure 21:
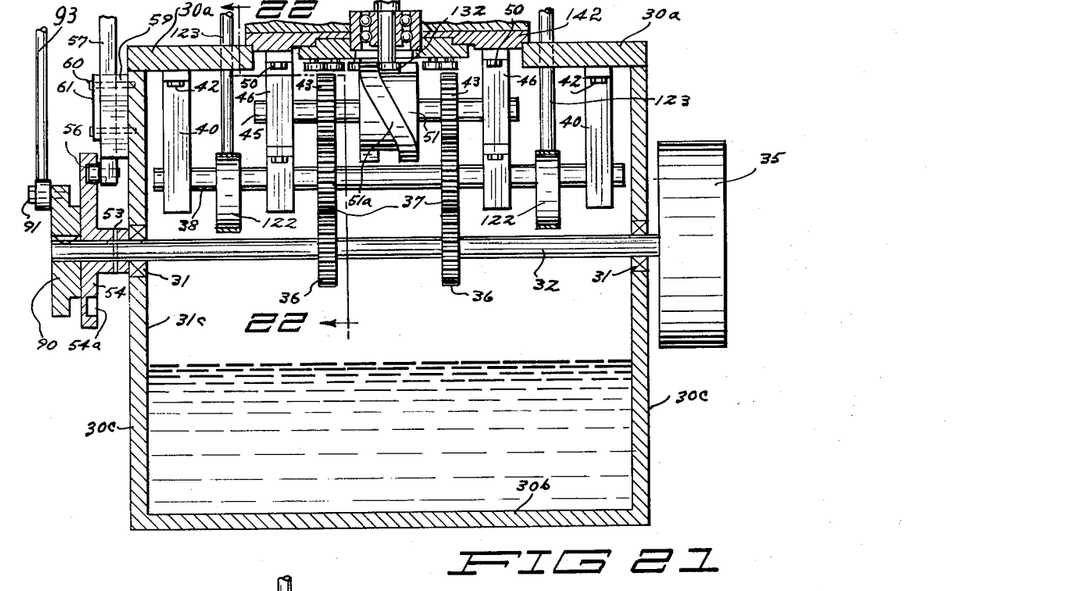
Fig. 21 is a vertical section taken substantially on line 21—21 of Fig. 2, as indicated by the arrows, the same being taken through the base portion of the machine.
Figure 22:
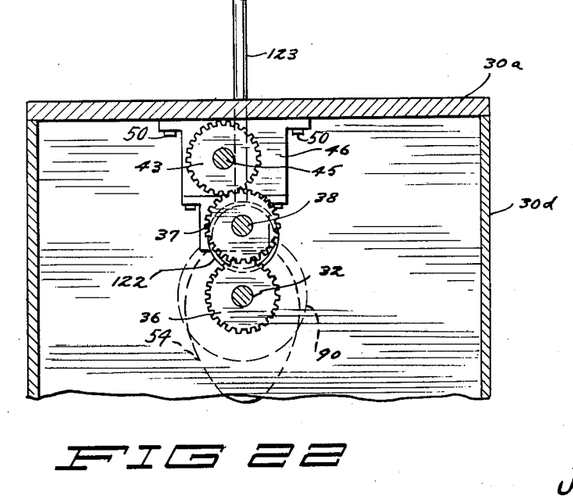
Fig. 22 is a vertical section taken on line 22—22 of Fig. 21, as indicated by the arrows.

Referring to the drawings, a machine is shown comprising a base portion 30 which is rectangular in plan, the same having a flat plate 30a at its top and having a bottom, side and front walls 30b, 30c and 30d respectively (Figs. 21 and 22). The side walls 30c carry bearings 31 in which is journaled a main driveshaft 32 which is suitably driven by a pulley 35 or other driving power. Shaft 32 has secured thereto gears 36 which mesh respectively with gears 37 secured to a shaft 38 journaled in bearings 40 which are secured to the underside of plate 30a by any suitable means, such as the screws 42. Gears 37 mesh with gears 43 secured to a shaft 45 journaled in bearings 46 which are secured to a circular stationary plate 142 supported on plate 30a. Bearings 46 are secured by any suitable means, such as the screws 50. Bearings 46 also provide bearing for shaft 38. Shaft 45 carries a cam 51 of substantially cylindrical form having in its periphery a helical cam groove 51a. Shaft 32 has secured thereto in any suitable manner, as by the pin 53, a cam 54 having in one side a cam groove 54a. A roller 56 is disposed in cam groove 54a. Roller 56 is journaled in the lower end of a guide rod and link 57 illustrated as of rectangular form in horizontal cross section, the same moving in a guide block 59 secured to one side wall 30c by bolts 60 which also hold a cover plate 61 on said block. The link bar 57 extends upwardly and passes through another guide member 63 secured by screws 64 to one end of a cross-head 65 to be later described. The upper end of link bar 57 carries a block 66 having a horizontal guide groove 66a therein in which is disposed a roller 67 having a reduced supporting trunnion 67a journaled in one end of a lever 69 which is swingable about a shaft 70 carried in a bracket 71 secured to the top of cross-head 65 at one side thereof. The other end of lever 69 carries a roller 73 having reduced supporting portions 73a journaled in lever 69, said roller being disposed in a horizontal slot or guideway 74a in a block 74 secured to the top of a rod 75 which moves vertically in the cross-head 65. Rod 75 carries at its lower end a die member 78 (see Fig. 25) which is threaded thereon, which die moves in another cup-shaped die 80 carried at the lower end of a screw-threaded guide 82 threaded into cross-head 65 having thereon a lock nut 84 engaging the lower side of cross-head 65, and a nut 85 engaging the top of the cross-head bottom plate. A collar 86 is carried on rod 75 below a pin 87 and is engaged at its lower side by a compression coiled spring 88 surrounding rod 75 and bearing at its lower end on guide 82. Spring 88 acts to move rod 75 upwardly.

The shaft 32 has secured thereto at its outer end a crank disk 90 to which is secured by a stud 91 one end of a link 93. The other forked or bifurcated end 94 is secured to the outer end of an arm 95a projecting from a disk 95 secured to a shaft 96. Shaft 96 is journaled in suitable bearings in a frame portion 98 supported upon a portion of top plate 30a. Shaft 96 drives one of a pair of feed rollers 100 and 101 which are adapted to intermittently feed a strip of paper 102 carried in a roll on a drum 104 having trunnions 105 suitably journaled in frame portion 98. The upper feed roll 101 is carried on a shaft 106 journaled in a block 108 movable in a guideway in a pair of brackets 109 and 110 having top portions 109a and 110a in which are threaded headed screws 111 having a plate 112 at its bottom engaging the top of compression coiled springs 114 the lower ends of which engage the top of block 108. Feed roll 101 is thus yieldingly held against the strip of paper 102 and the pressure thereon can be adjusted by screws 111. Shafts 96 and 110 carry meshing gears 113 and 115. The paper 102 is fed beneath the dies 78 and 80 and a die plate 116 and over a die opening 116a therein. Plate 116 is supported by brackets 119 secured to a plate 118 having an opening 118a therein axially alined with opening 116a and having a shallow counterbore at its top. Plate 118 is carried on brackets 120 disposed at either side of top plate 30a. (See Fig. 1).

Figure 1:
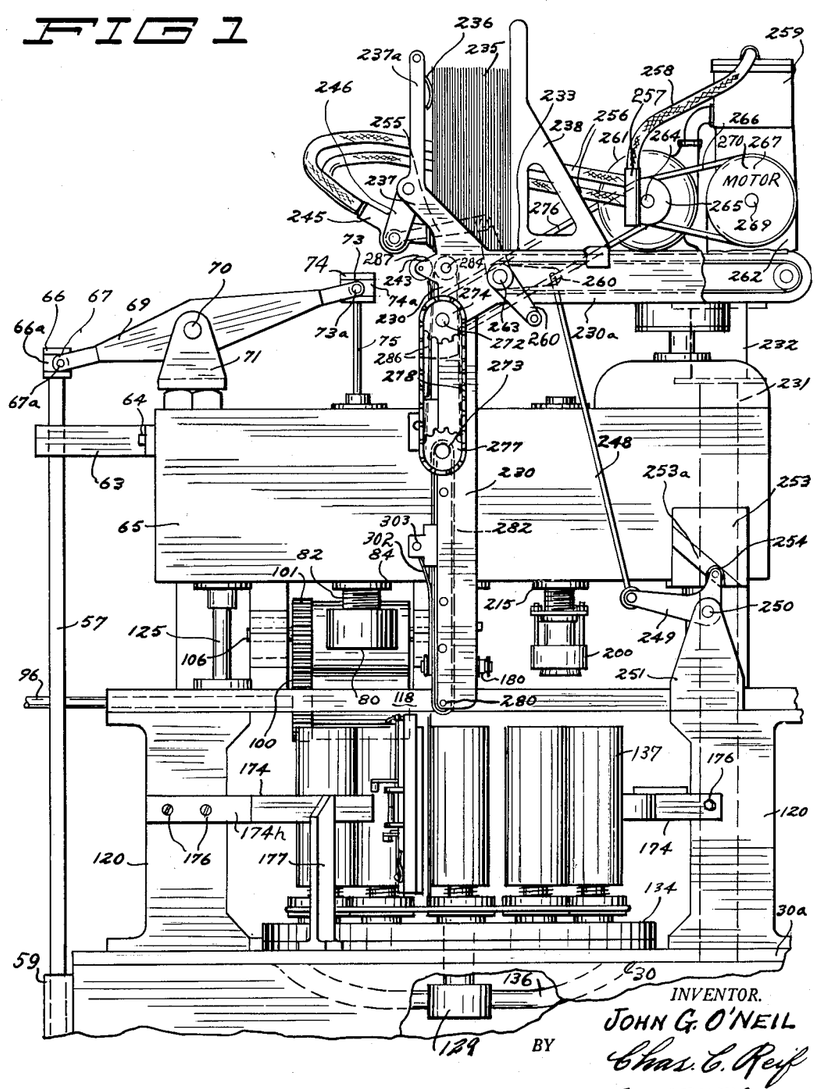
Fig. 1 is a view in front elevation of said apparatus, a lower portion being broken away.
Figure 2:
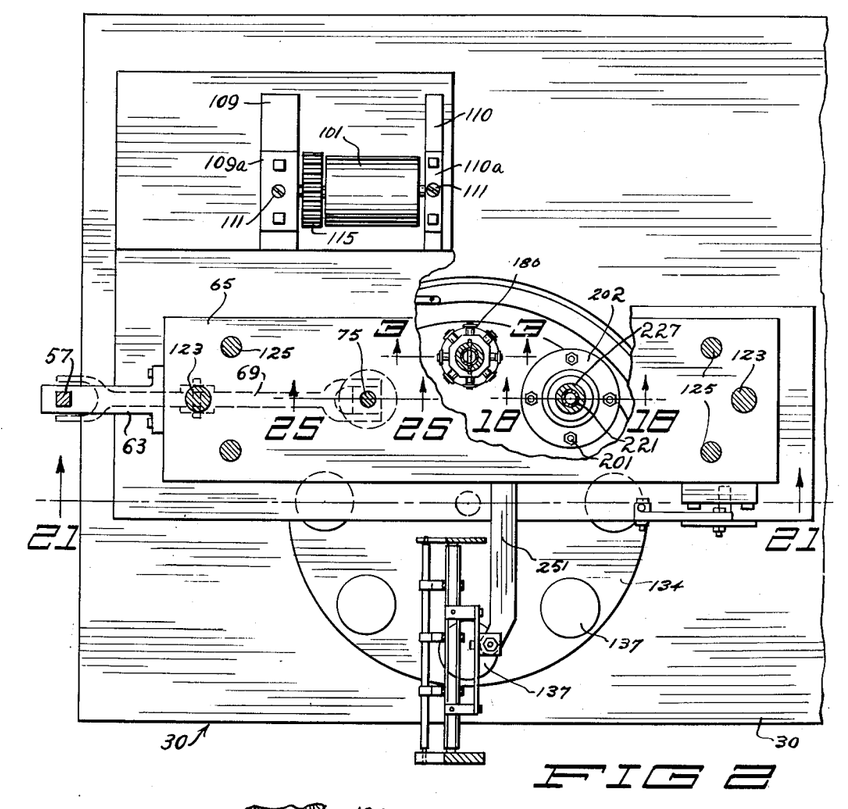
Fig. 2 is a partial top plan view, some portions being broken away and others shown in horizontal section.
Figure 4:
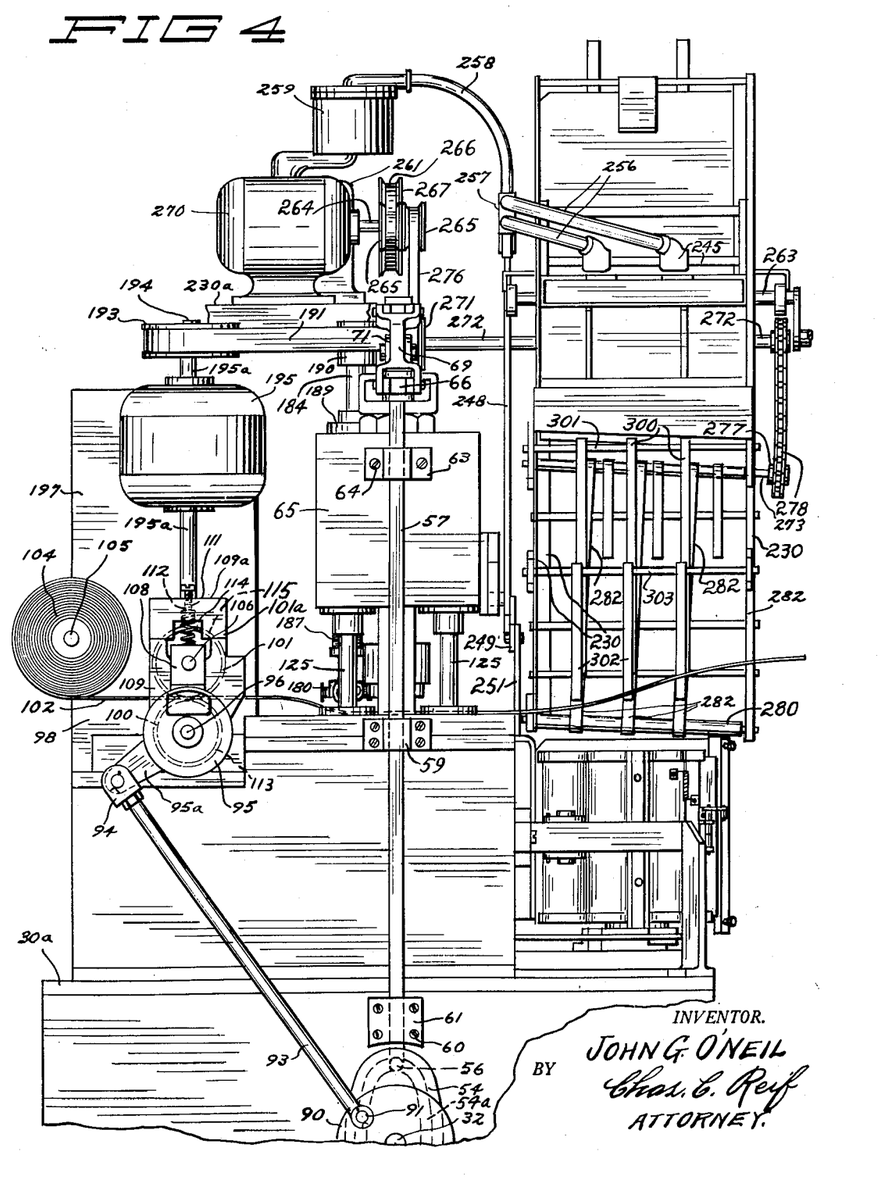
Fig. 4 is a view in side elevation of the apparatus.

The shaft 38 also carries a pair of spaced eccentrics 122 having straps connected to rods 123 which are secured to cross-head 65. Cross-head 65 is also guided in its vertical movement by rods 125, there being a pair of such rods at either end of the cross-head, as shown in Fig. 2. Cross-head 65 is thus raised and lowered by eccentrics 122. As clearly shown in Figs. 1, 2 and 4, cross-head 65 is of box form, being rectangular in vertical and horizontal cross section and having its long side extending transversely of the machine. Said cross-head has top, end, side and bottom plates. The cross-head at its lower side also carries the spinning head and the crimping and sealing head to be later described.

Figure 11:
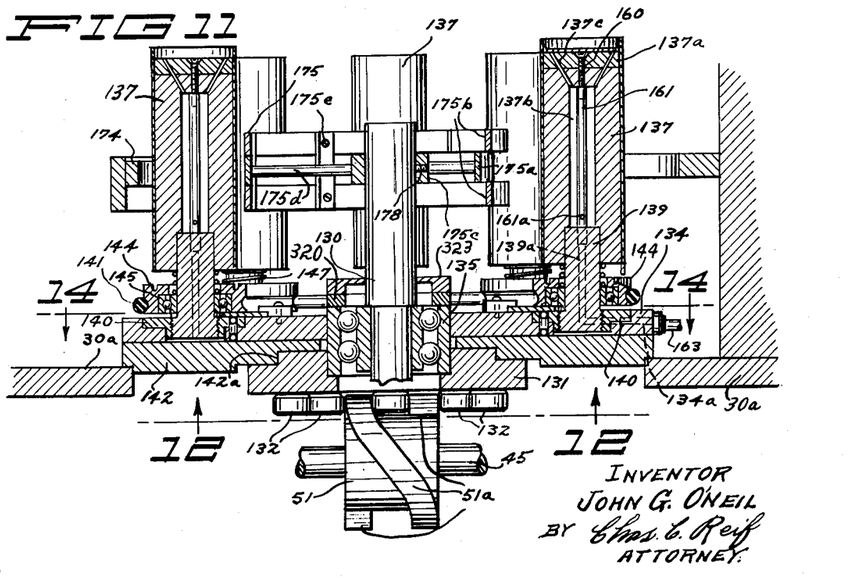
Fig. 11 is a vertical section taken substantially on line 11—11 of Fig. 12, as indicated by the arrows.
Figure 12:
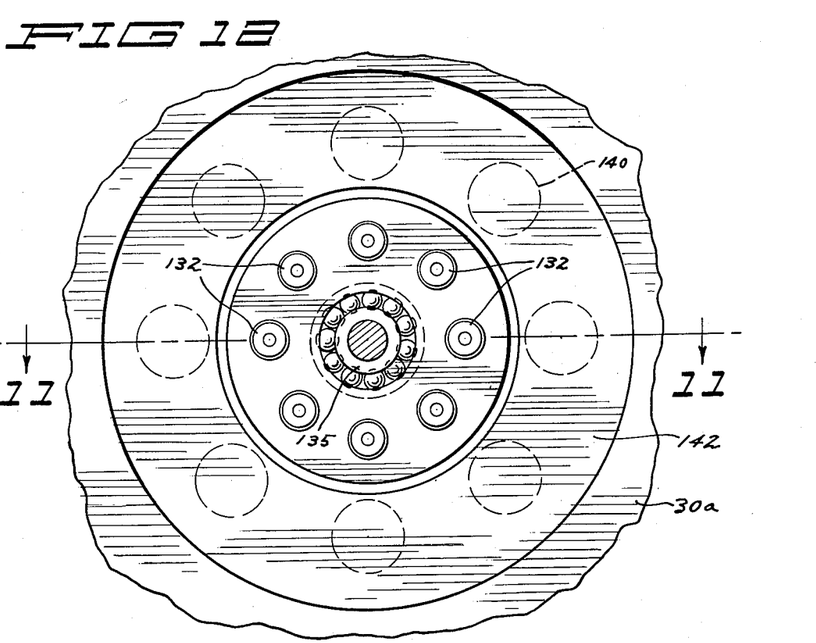
Fig. 12 is a horizontal section taken substantially on line 12—12 of Fig. 11, some parts being indicated in dotted lines.
Figure 14:
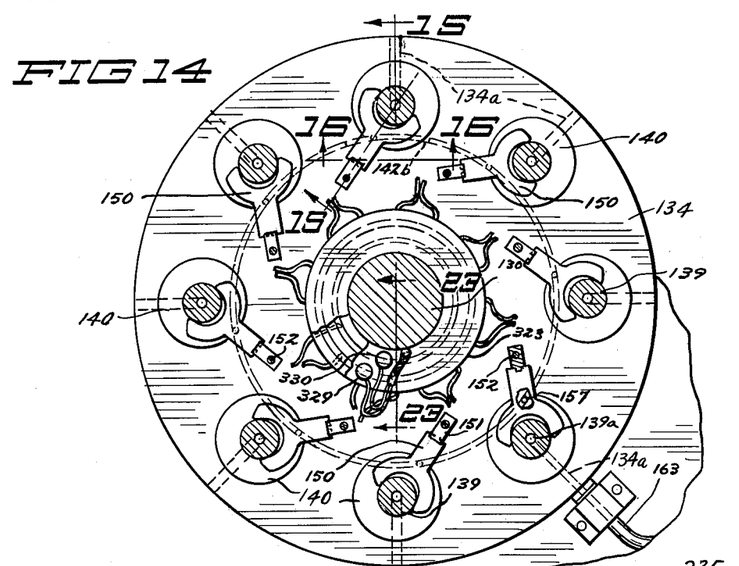
Fig. 14 is a horizontal section taken substantially on line 14—14 of Fig. 11, as indicated by the arrows.
Figures 15, 16, 17:
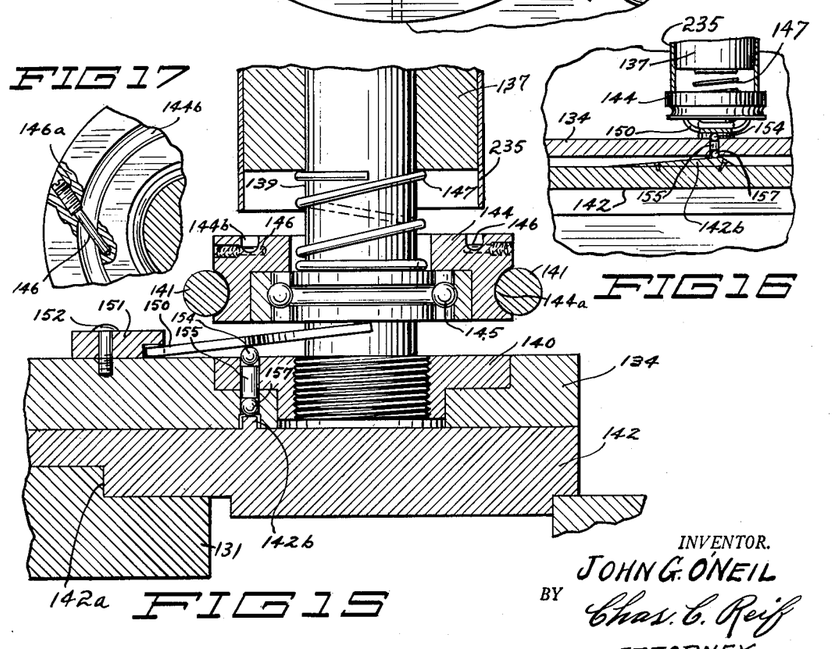
Fig. 15 is a vertical section taken on line 15—15 of Fig. 14, as indicated by the arrows.
Fig. 16 is a vertical section taken substantially on line 16—16 of Fig. 14, as indicated by the arrows.
Fig. 17 is a partial plan view of a portion of Fig. 15, Figs. 15, 16 and 17 being shown on an enlarged scale.

A stationary shaft 130 is provided the same being secured at its lower end in a boss 129 carried on bracket 136 secured to base member 30. Shaft 130 extends upwardly from boss 129 vertically through a generally cylindrical plate 131 carrying at its lower side a plurality of cam rollers 132 which are successively engaged by cam 51 and against the helical rib 51a thereof. Rib 51a extends along the opposite sides of cam 51 and its ends terminate with a circumferential space therebetween, as shown in Fig. 11. One roller 132 is moved to the right, as seen in Fig. 11, by the roller being moved by rib 51a. The roller thus moved to the right of rib 51a is later engaged by said rib as its end reaches said roller and said roller is then moved to the right by the helical side of rib 51a. Rollers 132 are thus successively moved by cam 51. A rotatable table 134 is provided of cylindrical plate-like form. A ball bearing 135 is provided, the inner race of which is secured to shaft 130. Members 131 and 134 thus rotate about the bearing 135. Table 134 carries a plurality of circumferentially and equally spaced mandrels 137. In the embodiment of the invention illustrated, there are eight of these mandrels and there are thus eight of the rollers 132. Each mandrel 137 is fitted over a supporting spindle 139 the lower enlarged end of which is threaded into a flanged collar 140 which is secured in table 134, as by circumferentially spaced screws not shown. A stationary plate 142 is disposed between table 134 and plate 131, the same having an outer flanged portion resting on the top of top plate 30a of base member 30. Plate 142 is provided with counterbores, one of which provides a shoulder 142a which engages an upper reduced portion of plate 131. The outer race of bearing 135 is secured to table 134 and plate 131. A spinning member 144 is journaled on each of the members 139 by the ball bearing 145. Said spinning member 144 has a belt groove 144a in its periphery and also has an annular slot 144b in its top somewhat adjacent its edge, having a substantially semi-cylindrical bottom. A plurality of circumferentially spaced pins 146 extend tangentially through slot 144b, as shown in Fig. 17, said pins having threaded outer portions 146a threaded into member 144. A compression coiled spring 147 surrounds member 139 and bears at its upper end against the bottom of mandrel 137 and at its lower end against the inner race of ball bearing 145 which is secured to spinning member 144. (See Figs. 11 and 15.) A lever 150 is provided for each spinning member 144, as shown in Figs. 14 and 15, the same having an outer forked end embracing member 139 and engaging the bottom of member 145. Members 144 and 145 are movable vertically relatively to spindle 139. The outer end of each of said levers is held under the projecting lip of a plate 151 secured to table 134 by the headed screws 152. Each lever 150 is fulcrumed upon a ball 154 carried at the top of a movable pin 155 disposed in a bore in collar 140, said pin resting upon another ball 157. Ball 157 rests upon the top of plate 142 and is adapted to pass over a raised or cam portion 142b on plate 142. A belt 141 extends around the outer side of each of the spinning head members 144, said belt then passing around a pulley 159 mounted for rotation on a shaft 143 secured to top plate 30a. The pulley 159 carries a plate 143a extending over the belt 141. Belt 141 passes from the pulley 159 around a driving pulley 146 secured to a shaft 147 which is connected by a coupling 148 to the shaft 195a of motor 195, shown in Fig. 4. The lower end of shaft 147 is also disposed in a bearing 148.

Each mandrel 137 has a top portion 137a secured by a countersunk central screw 160 which is threaded into a rod 161 disposed centrally of mandrel 137, said rod having a bore therein in which extends one or more holes 161a. Rod 161 is disposed in a bore 137b in mandrel 137. Mandrel 137 and its portion 137a have a plurality of passages 137c formed therein extending from the top of bore 137b to the top of portion 137a. A passage 139a extends downwardly in member 139 communicating with the bore in rod 161 and with a passage 134a in table 134. A tube or conduit 163 is provided having an end portion engaging the periphery of table 134 and adapted to have its opening alined with opening 134a when the table is in a certain position. Air under pressure will be supplied to tube 163 and this will blow the formed container off of the mandrel when the container is completed.

Figures 5, 6, 7:
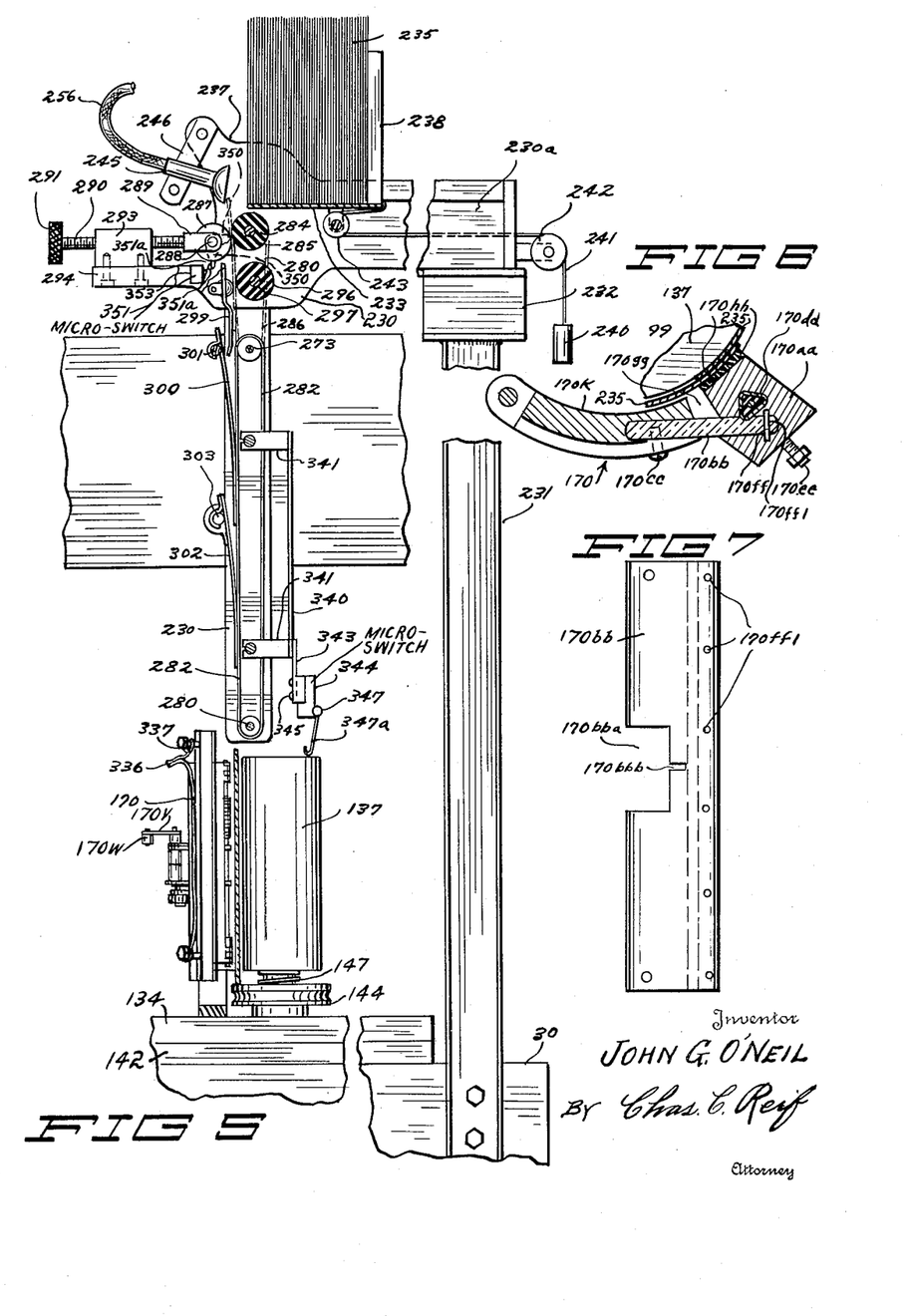
Fig. 5 is a view partly in front elevation and partly in vertical section of a portion of the apparatus.
Fig. 6 is a view in horizontal section of an electrode and its holder, the same being taken substantially on line 6—6 of Fig. 9 as indicated by the arrows.
Fig. 7 is a view in side elevation of a member which carries the electrode.
Figure 8:
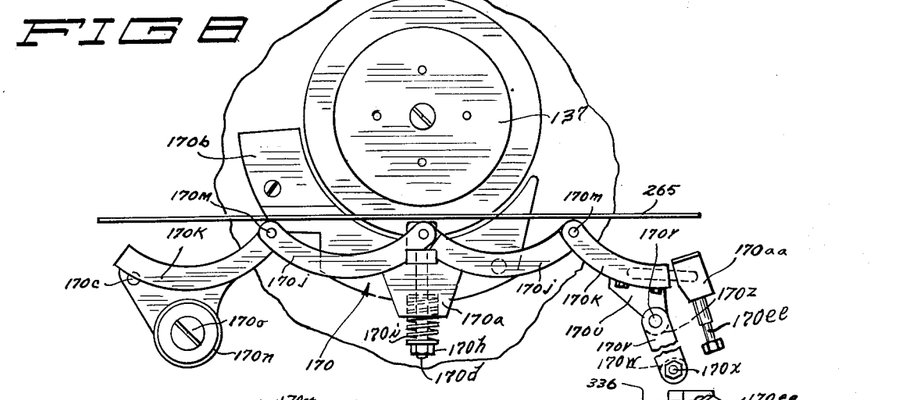
Fig. 8 is a top plan view of a wrapping element and mandrel used.
Figures 9, 10:
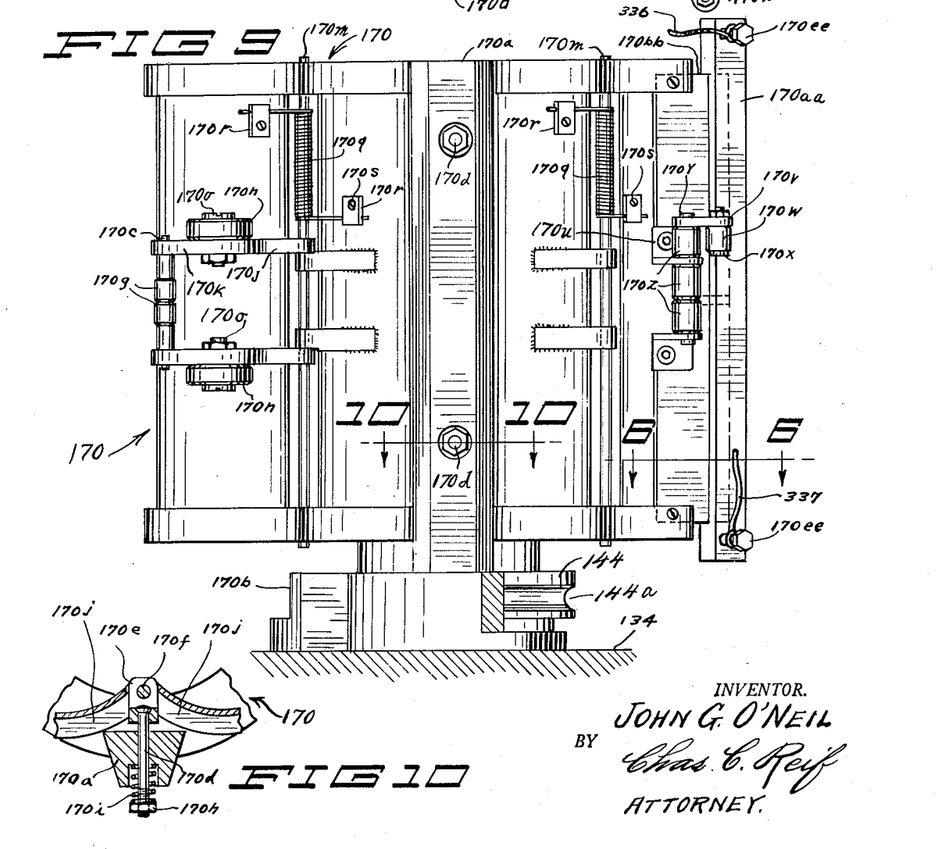
Fig. 9 is a view in rear elevation of said wrapping element and a spinning head used.
Fig. 10 is a horizontal section taken on line 10—10 of Fig. 9, as indicated by the arrows.
Figure 13:
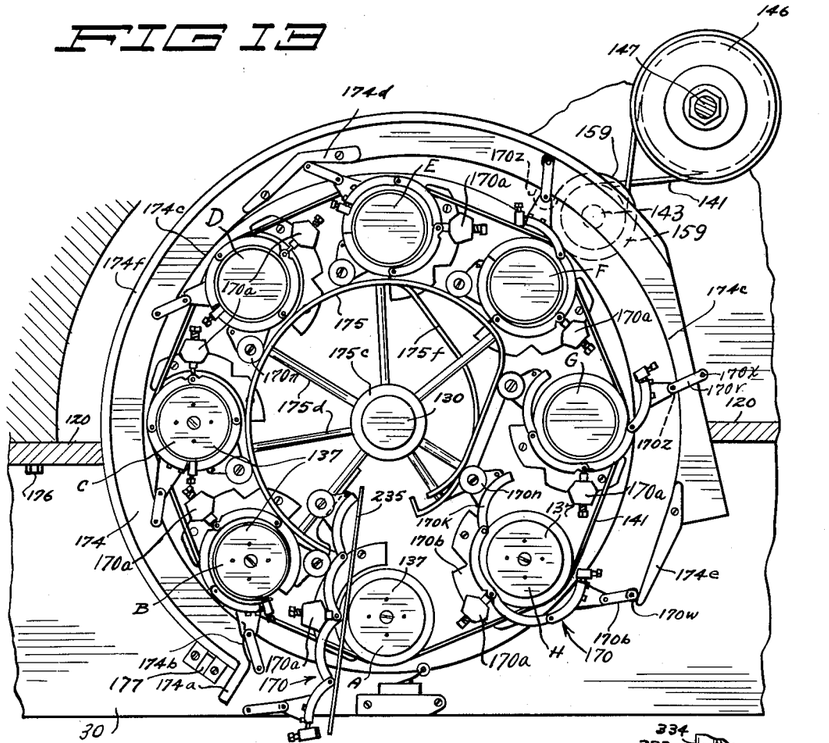
Fig. 13 is a top plan view of the rotating table, mandrels and adjacent parts, a portion being shown in horizontal section.

A wrapping element 170 is provided for each of the mandrels 137. This wrapping element comprises a standard 170a. (See Figs. 5, 8, 9, 10 and 13.) Said standard 170a is of general trapezoidal form in horizontal cross section, as shown in Fig. 10, and the same is secured at its lower end to a base flange 170b which is secured to the top of table 134 by suitable screws. A pair of spaced pins 170d extend through standard 170a and have heads 170e on their inner ends which carry vertical pivots 170f. Each pin 170d is threaded at its outer end to receive a nut 170h which engages the outer end of a compression coiled spring 170i, the other end of which seats in a recess in standard 170a. Spring 170i thus tends to force pin 170d outwardly. Pivoted to and swingable about the axis of pin 170f are sections 170j of the wrapping element and outer sections 170k are pivoted to sections 170j at their outer ends by the pivots 170m. As shown in Figs. 8 and 13, the sections 170j and 170k have concave semicylindrical inner surfaces. These surfaces have radii which are substantially the same as the radii of the mandrels 137 and the sections 170j and 170k are adapted to be folded about the mandrels, as shown in Fig. 13. One outer section 170k has spaced portions extending from its outer side on which are carried cam rollers 170n secured by headed and nutted screws 170o. A pin 170c extends between said portions and has thereon a pair of cam rollers 170g held in position by suitable spacing collars. A torsion spring 170q surrounds the pivot pins 170m, the ends of said springs being respectively secured to the adjacent sections by small clips 170r secured to said sections by the screws 170s. Springs 170q tend to hold the sections 170j and 170k in the open position shown in Fig. 8. A bracket 170u extends from one section 170k and has an arm 170v secured thereto which carries a cam roller 170w held therein by a headed and nutted bolt 170x. Member 170v is connected to bracket 170u by a pin 170y on which are mounted a plurality of cam rollers 170z. An electrode 170aa is carried on the section 170k having the bracket 170u thereon, said electrode being supported on a plate-like member 170bb disposed in a recess in section 170k and also held by a screw 170cc. Member 170bb extends into a recess in the electrode 170aa. Electrode 170aa has disposed in a passage extending longitudinally thereof the conductor 170dd and binding posts 170ee disposed adjacent the top and bottom of said electrode engage the conductor 170dd. Specifically conductor 170dd comprises a central conductor proper which in practice has been made of Nitrone, a special metal of high conductivity surrounded by Nitrone zircone. Said zircone is an insulating silicate product, which is in turn surrounded by Inconel, another special metal. The member 170bb is made of silicon fiber glass. The special metals Nitrone and Inconel are metals having a high magnetic quality or permeability so as to cause an unusually high number of magnetic lines of force to pass therethrough. The body of the electrode 170aa is made of aluminum. The aluminum is cast about the conductor and the member 170bb. Member 170bb has in one side a rather large slot 170bba and a small slot 170bbb extends from said larger slot. When the metal forming the electrode 170aa is poured about the member 170bb the latter expands longitudinally and closes up the slot 170bbb which was filled with some soft substance for the casting operation. Member 170bb is provided with a plurality of small holes 170ff adjacent one side thereof and small pins 170ff are disposed in said holes and project at either side of member 170bb to form bonding or holding means for the metal of the electrode. The large slot 170bba is formed in member 170bb in order to accommodate two of the rollers 170z, as shown in Fig. 9. As shown in Fig. 6, there is a space 170gg between the electrode and the section 170k. This provides room for the blank and for the rolled open end of the container to pass when it is blown off the mandrel. A layer of silicon rubber 170hh is secured to the face of electrode 170aa, the same having a multiplicity of small holes therethrough for the better transmission of heat to the container.

Cam means are provided for operating the wrapping element 170 and these include an outer cam 174 (see Figs. 1, 11 and 13) and an inner cam 175. Outer cam 174 has portions 174h secured to the brackets 120 by suitable screws 176, and also to a smaller bracket 177 which will be secured to the top plate 30a. Said cam 174 has an outwardly extending portion 174a at its front end adjoining which is a curved surface 174b which extends to the inner partly cylindrical surface 174c. A recess 174d of angular form is formed in surface 174c substantially midway of the cam and said cam has at its other end a projecting portion 174e having a substantially straight inner surface tangent to surface 174c. The inner cam 175, as shown in Fig. 11, is formed of three bands in vertical planes, one above the other. Cam 175 has a central hub 175c from which rods 175d extend substantially radially to support the bands 175a and 175b. The top and bottom bands 175b are secured to the central band by one or more strips 175e. Hub 175c is secured to the shaft 130 by a suitable set screw 178. A brace 175f extends across cam 175.

Figure 3:
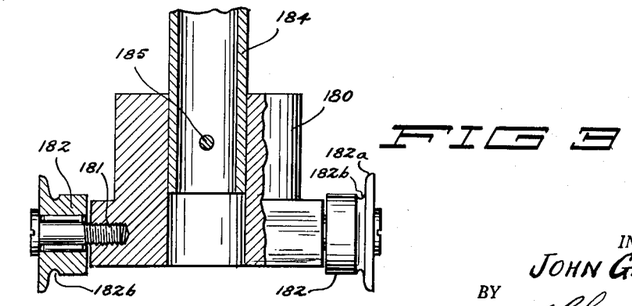
Fig. 3 is a view of a spinning head used, some parts being in side elevation and others in vertical section.
Figure 25:
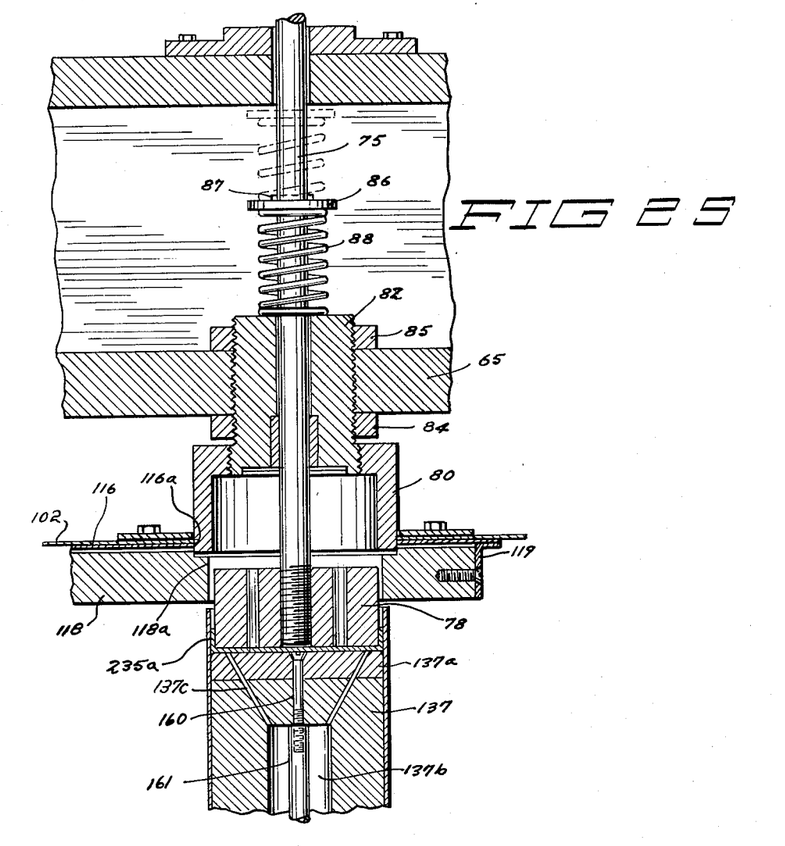
Fig. 25 is a vertical section taken substantially on line 25—25 of Fig. 2.

When the container arrives at the station at which the bottom is placed therein, it is in axial alinement with shaft 75 (Fig. 25). At the next station a spinning head is disposed and this comprises a member 180 (Fig. 3) of general cylindrical form having a lower portion of greatest diameter in which are secured a plurality of circumferentially spaced headed screws 181 on which are journaled spinning rollers 182, said rollers being shown as mounted upon needle bearings. Rollers 182 are shown as having a flange with a flat outer face and a curved surface 182a extending to an annular groove 182b. Member 180 is mounted upon a tubular supporting member 184 secured to member 180 in any suitable manner, as by a pin 185. Member 184 is received in a rather large screw or threaded member 187 threaded into the crosshead. Member 184 extends through screw 187 and through another collar-like member 189 secured to the top of the cross-head and has secured to its upper end a pulley 190. A collar 183 is secured to member 184 and rides on member 189. Pulley 190 is rotated by a belt 191 running thereover and also running over a flanged pulley 193 secured to a shaft 194 which forms the driving shaft of an electrical motor 195 secured to a bracket 197 which upstands from the top plate 30a.

A crimping and sealing device is provided at the station succeeding the station at which the spinning head is disposed and the same comprises a member 200 of annular form having a central opening the lower portion of which flares downwardly and is provided with corrugations or substantially triangular ribs 200a. Circumferentially spaced screws or stud bolts 201 are threaded into the top of member 200 and extend through an annular plate 202 adjacent their upper ends, the same being equipped with nuts 204 engaging the top of plate 202. Plate 202 has a central opening fitting about the reduced portion of a member 205 having a cylindrical periphery. A member 207 having a cylindrical periphery flush with that of member 205 has reduced end portions about the upper of which member 205 fits. The reduced portion at the lower side of member 207 fits in the opening in member 200. Members 200, 205 and 207 are thus held together by the screws or stud bolts 201. Member 200 acts as a sealing electrode and for this purpose is equipped with a conductor 208, the same being disposed in an annular passage 200b in member 200. Member 208 is shown as surrounded by a member or material 210 which is in turn surrounded by an annular sheathing or conduit 211. Parts 208, 210 and 211 can be made of the same material as the conductor 170dd. Conductor 208 has a pair of binding posts 212 secured thereto from which extend suitable conductors 214. Member 205 is threaded into the cross-head 65 and will be provided with a suitable locking nut or ring 215. A member 218 is provided, the same being of general frusto-conical form flaring downwardly and having on its periphery a multiplicity of corrugations or substantially triangular ribs 218a complemental to ribs 200a. Member 218 is provided with a central bore having a counterbore at its lower end. A plug 220 has a portion fitting in said counterbore and a reduced portion fitting in said bore. A central cylindrical supporting member 221 has a reduced portion fitting in the upper end of said bore in member 218 and the plug 220 is secured to this portion by a countersunk screw 222. A cylindrical member 224 overlies member 218 and has a central opening into which the reduced lower end of member 221 fits, the shoulder at the top of said reduced portion engaging the top of member 224. Member 224 will be made of some insulating material, such as fiber. The supporting member 221 will be secured in the cross-head 65. Member 218 has an annular recess in its upper side in which are disposed a number of conductors 225 encased in suitable sheathing materials 225a and 225b which may be the same as those used with conductor 170dd. Member 224 is provided with an opening 224a, and a pair of binding posts 228 are disposed in said opening and extend to and engage the conductors 225. Conductors 229 are respectively secured to binding posts 228 by the usual nuts, said conductors extending into member 221 and upwardly through a central opening in member 221. A compression coiled spring 223 surrounds member 221, the same engaging member 205 at its upper end and engaging member 224 at its lower end. Member 205 is provided with an upper threaded portion 205a which is threaded into the cross-head 65 and provided with a suitable locking ring or nut 215. A collar 227 surrounds member 221 and seats on the top of portion 205a. A bushing 226 is disposed in portion 205a at the upper portion thereof. It will be seen that members 205, 207 and 200 can move along member 221 and that spring 223 will be compressed when this movement takes place.

A feeding mechanism for the blanks from which the containing is made is shown, and while this per se forms no part of the present invention, it will be briefly described. Said mechanism comprises a bracket 230 which has a vertically extending arm and a rearwardly horizontally extending arm 230a. Said bracket 230 is supported by a channel 231 secured at its lower end to the front of base member 30 and at its upper end to a bracket 232 which in turn supports the arm 230a. A plate 233 extends horizontally at the top of arm 230a and forms a support for a plurality of the blanks 235 which stand in vertical planes. The front of these blanks engages a resilient member 236 carried by the upwardly extending arm 237a of a bracket 237 secured to arm 230a. A follower 238 has a front surface engaging the rearmost of the blanks 235 and said follower is urged forwardly by a counterweight 240 carried by a cable 241 running over a pulley 242 and over a pulley 243 from which it extends to and is connected to the follower 238. A suction head head 245 is swingably mounted by a link 246 on bracket 237. Suction head 245 is intermittently swung by a link 248 which is connected to one arm of a bell crank lever 249 oscillatably mounted on a shaft 250 carried in a bracket 251 secured to the top of base member 30. A cam block 253 is secured to the rear of the cross-head 65 and has in the side thereof a cam slot 253a. A roller 254 is journaled at the end of the other arm of bell crank lever 249 and is disposed in slot 253a. Link 246 is pivotally connected by a link 255 to one end of a bell crank lever 260 mounted on a shaft 263. The other arm of lever 260 is pivotally connected to link 248. It will be seen that as cross-head 65 reciprocates vertically, bell crank lever 249 will be oscillated and link 248 will be reciprocated to swing the suction head 245 through link 255 and lever 260. Suction head 245 is connected by flexible tubes 256 to a connection 257 from which extends a tube 258, to a casing 259 having a chamber therein in which is maintained a partial vacuum by means of a fan in a casing 261 secured to a shaft 264. A belt 266 runs over double pulley 265 and over a pulley 267 secured to the driving shaft 269 of a motor 270 supported on arm 230a. Bracket 230 has shafts 272 and 273 journaled therein. A sprocket 274 is secured to shaft 272. A pulley 271 is secured to shaft 272 over which runs a belt 276 also running over pulley 265. A sprocket 277 is secured to shaft 273 and a chain 278 runs over sprocket 274 and over sprocket 277. Another shaft 280 is journaled in bracket 230 and a plurality of narrow belts 282 run over shafts 273 and shaft 280, the same extending in substantially parallel relation. A feed roll 284 is carried on a shaft 285 extending transversely of arm 230a and extends beneath the plate 233. Shaft 285 is driven by a belt 286 running over a pulley on shaft 273. A roller 287 rotates on a shaft 288 carried in a forked head 289 secured to the end of a screw 290 having a hand wheel 291 at its end. Screw 290 is threaded in a block 293 secured to an arm 294 projecting from arm 230a. Another feed roller 296 carried on a shaft 297 journaled in arm 230a is disposed below driven roller 284. A series of guide strips 298 and 299 respectively are disposed in front of roller 297 and extend downwardly at the front side of the belts 282. See Fig. 5. Guide strips 298 are not seen as they align laterally with strip 299. Flexible strips 299 loosely engage said belts. Other flexible guide strips 300 are supported on a rod 301 projecting from bracket 230 and extend downwardly, the same sloping toward and substantially engaging the front side of belts 282. Other guide strips 302 are supported on a rod 303 carried by bracket 230 and extend downwardly in front of the belts 282, said strips sloping toward and substantially engaging said belts 282 at their lower ends. As shown in Fig. 5, the blank as it is moved downwardly by the belts 282 is vertically alined with the space between a mandrel 137 and its wrapping element 170.

Current is supplied to the electrodes 170aa continuously while the machine is in operation and for this purpose a ring 320 of insulating material is secured in the center of table 134 in any suitable manner, as by suitable screws. Ring 320 carries annular spaced conductor rings 321 and 322. A plate 323 of the same diameter as ring 320 overlies said ring and has a central opening through which extends shaft 130. Conductors 325 and 326 extend through plate 323 and respectively contact the rings 321 and 322. Binding posts 329 and 330 are carried by plate 323 the same being electrically connected to the conductors 325 and 326 respectively. Flexible conductors 332 and 333 are connected to the binding posts 329 and 330 respectively and extend upwardly in a conduit 334 along shaft 130. Conductors 336 and 337 extend respectively to the binding posts 170ee on the electrodes 170aa. The conductors 332 and 333 will of course be connected to a suitable source of current. A strip 340 is supported from bracket 230 by small spaced brackets 341 (see Fig. 5). Another small bracket 343 is secured to the lower portion of strip 340 and has a block 344 of insulating material secured thereto. A micro-switch 347 is carried on block 344 having a swinging contact arm 347a, the lower end of which is disposed a slight distance above the top of the mandrels 137.

A small bell crank lever 350 is oscillatably mounted on shaft 288 having one arm projecting toward roller 284 and having its end disposed adjacent the plane in which the blank is fed downwardly. The other arm of lever 350 is disposed close to the movable operating arm 351a of a micro-switch 351 carried on a block 353 secured to bracket 294.

In operation the blanks 235 which are made of rather stiff strong paper will be disposed on plate 233 between member 236 and the follower 238. Said blanks are coated on each side with a lacquer making a waterproof coating. Such lacquers are well known in the art and while various ones might be used, in practice pigmented vinol has been found very satisfactory. When motor 270 is driven, a partial vacuum will be maintained in the chamber in casing 259. Shafts 264, 272 and 273 will be driven. Feed roller 284 will be driven as will the belts 282. The front runs of belts move downward close to the guide strips 299, 300 and 302. At each reciprocation of the cross-head 65 the suction head 245 will be oscillated. The front of said suction head normally engages the foremost blank 235. When head 245 is swung away from the blanks, suction is exerted therein and the foremost blank is moved forwardly to a position over the contact point of rollers 284 and 287. The suction or low pressure in suction head 245 is then cut off by means not shown and the blank drops downwardly between rolls 287 and 284. Said blank is immediately moved downwardly between strips 299 and roller 296 and the same moves downwardly quite rapidly between the front runs of belts 282 and the guide strips 300 and 302. Said front runs of belts 282 engage the blank and move it downwardly. The blank is thus moved downwardly quite rapidly and the same is deposited at one side of a mandrel 137 and between said mandrel and the wrapping element which in practice is called a cage. Said wrapping element is in the position shown in Fig. 8 in which the blank 235 is also shown. Should two or more blanks be simultaneously fed, bell crank lever 350 will be engaged and swung by the outermost blank and switch 351 will open the circuit of motor 35 and stop the machine.

Figures 18, 19, 20:
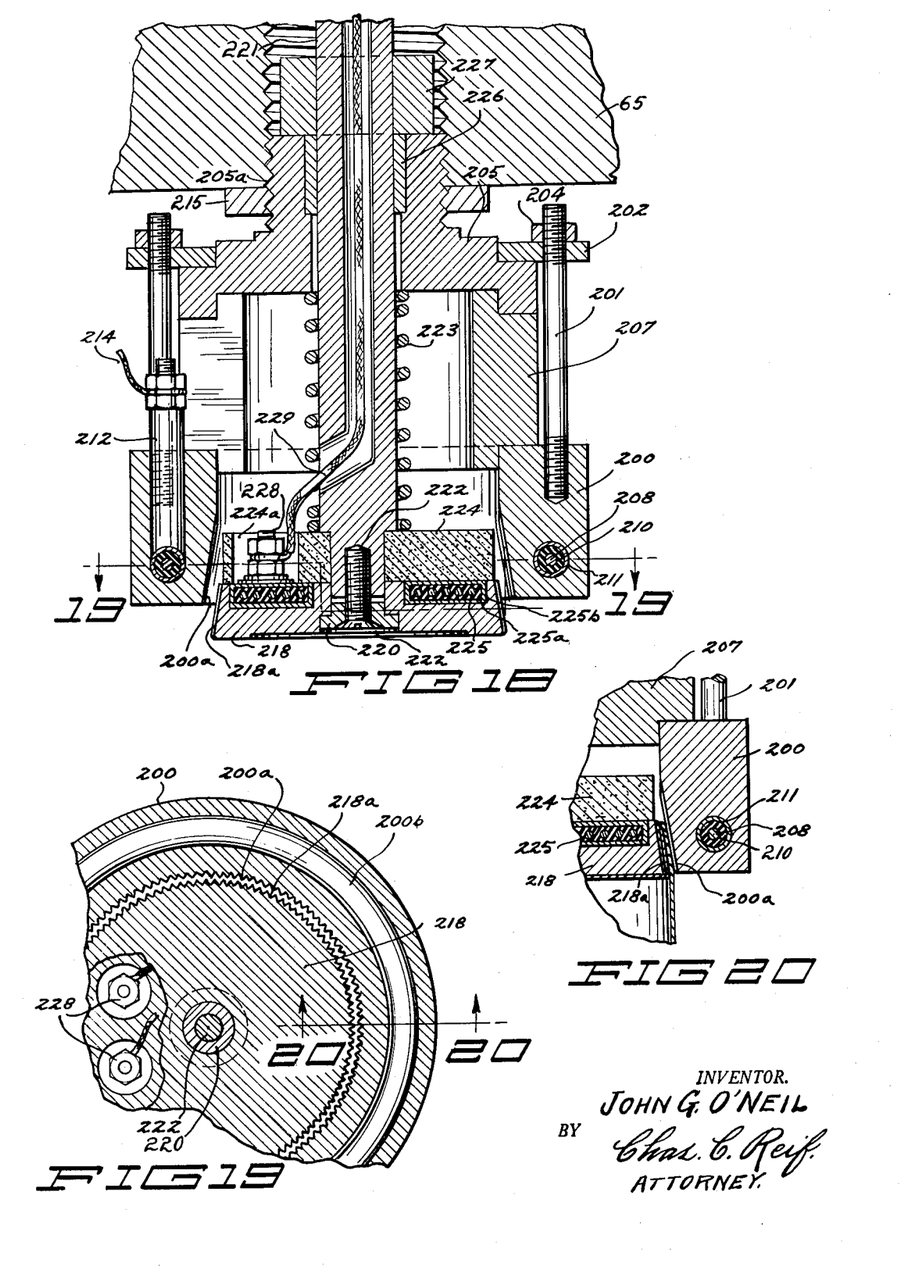
Fig. 18 is a vertical section taken substantially on line 18—18 of Fig. 2.
Fig. 19 is a horizontal section taken substantially on line 19—19 of Fig. 18, as indicated by the arrows.
Fig. 20 is a vertical section taken substantially on line 20—20 of Fig. 19, as indicated by the arrows.
Figure 28:
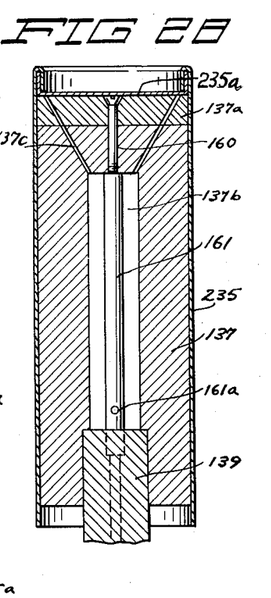
Figure 29:
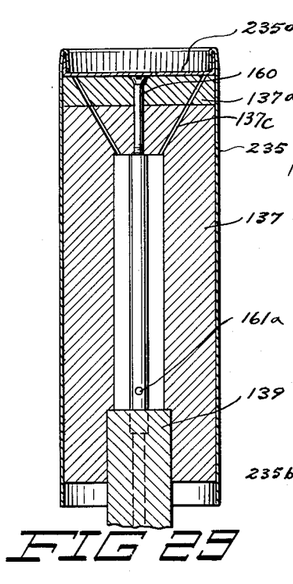

The particular mandrel 137 is now in the position at the front of table 134, as shown in Fig. 2. This will be called the first or A position. When the machine is started, motor 35 is also started and shaft 32 is driven. Shaft 45 is then driven through gears 36, 37 and 43 and cam 51 is rotated. At each revolution of shaft 45 one of the rollers 132 enters from the left, as seen in Fig. 11 between the parts of rib 51a and is moved one-eighth of a revolution of table 134 or through 45 degrees. There is a slight dwell between each movement of table 134 as each roller 132 after moving to the right of rib 51a with table 134 stops until engaged by the helical part of rib 51a. During this dwell the blank is deposited between the mandrel and the wrapping element or cage in the first position. The table is then moved through another 45 degrees and the next mandrel 137 comes to the first position. The blanks will be successively deposited between the wrapping cage and the mandrels at the first position. As the table is moved clockwise the wrapping cage is moved therewith and the inner sections 170j engage cam surface 174c and the outer surface of the inner cam 175 so that said sections take the position shown in the second position of the table which is designated position B in Fig. 13. Immediately after the inner sections engage said surface the cam rollers 170n engage the outer surface of the inner cam 175 and the rollers 170z engage the cam surface 174b and the end sections of the cage 170k are swung substantially to the position shown in position B in Fig. 13. It will be seen that there is a crescent-shaped space between the inner surfaces of sections 170j and the mandrel 137. As the mandrel continues its movement, the two cams 174 and 175 exert a pulling movement on the cage sections and this pulls the inner sections closely against the surface of the blank and pushes said blank into tight contact with the mandrel. This exerts a pull on pin 170d and spring 170i is compressed. The blank is thus wrapped tightly around the mandrel and the parts are in the position shown in position C in Fig. 13. In practice the parts are in the positions shown in position C before they leave position B. The space was left in position B to illustrate the action. When the blank is wrapped about the mandrel the edge portions of the blank overlap, as shown in Fig. 6. When the end section 170k carrying electrode 170aa engages the blank, the strip 170hh comes in contact with the overlapped edge portions of the blank. Electric current is now passed through the conductors 170dd by the conductors connected to binding posts 170ee. This current is applied during the entire rotation of table 134. At position D during the dwell in the movement of table 134, link bar 57 is moved downwardly by cam 54, thus oscillating lever 69 and moving down rod 75. The strip of paper 102 has been moved forwardly by operation of feed rollers 100 and 101 actuated through link 93 from cam 90. The cross-head 65 is given a reciprocation of each movement of table 134. As the blank is wrapped around the mandrel and reaches position D, the cross-head moves down and die 80 cuts a disk from the sheet of paper 93 as it moves through the opening in 116a in plate 116. Die 78 is then moved downward by rod 75 and this disk is moved through opening 118a and formed into a cup-shaped cap 235a shown in Fig. 25. This cup-shaped cap is pushed down into the top of the wrapped blank or container into contact with the top of mandrel 137. The cross-head and rod 75 are now lifted and the table moves the blank to position E. The cross-head is again moved downwardly and the spinning head comprising the rollers 182 is moved downwardly and this spinning head is being rotated rapidly by motor 195 and belt 191. The top portion of the blank and the flange of the cup-shaped disk 235a is now rolled inwardly, as shown in Fig. 28. The cross-head again moves upwardly and the table is again rotated to bring the mandrel to position F. The cross-head now moves downwardly and the crimping head comprising member 200 is moved down over the top portion of the container or blank. The member 218 moves inside of the upper portion of the container which has been spun down over the flange of the cup-shaped bottom placed in the container, and as member 200 moves down around the outside of the container, the flange of the cup-shaped bottom and the parts of the container at either side thereof are tightly crimped between the ribs 200a of member 200 and the ribs 218a on member 218. The bottom member and the container are thus pressed and crimped into close contact and are pressed together with great force. As said parts are thus pressed between members 200 and 218, current is applied to conductor 208 through the conductors 214, and current is applied to the conductors 225 through the conductors 229. Members 200 and 218 are thus heated and the parts crimped and pressed therebetween are sealed by the lacquer coating on said parts said lacquer being softened by heat and forming an adhesive. It may be stated that the sheet 102 is also coated on both sides with the lacquer. As member 200 and its connected parts move downwardly, spring 223 is compressed, and when the cross-head raises, spring 223 will bring the parts to the position shown in Fig. 18.

Figures 23, 24:
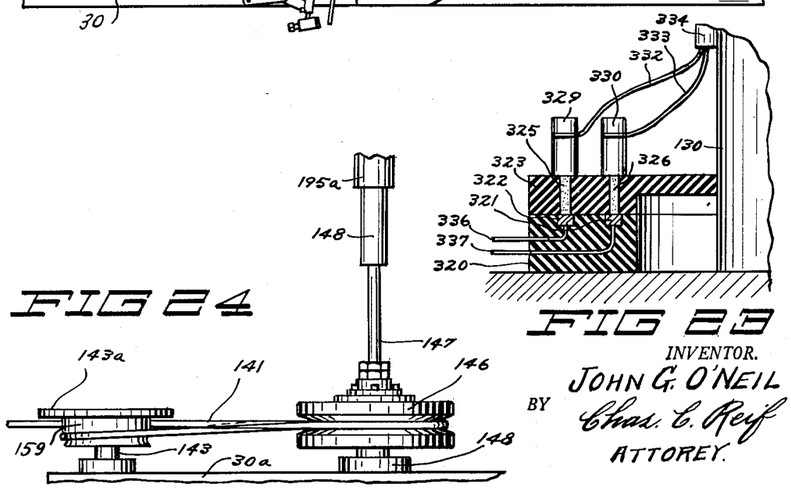
Fig. 23 is a partial view in vertical section taken substantially on line 23—23 of Fig. 14.
Fig. 24 is a partial view in side elevation showing the drive for the spinning heads below the mandrels.
Figure 30:
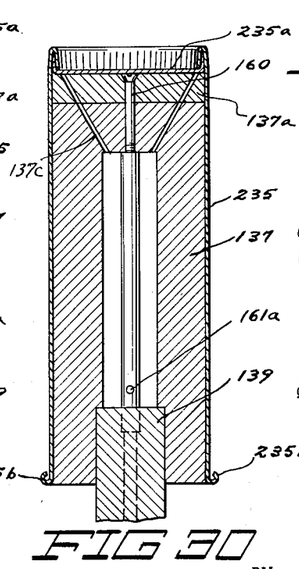
Figure 31:
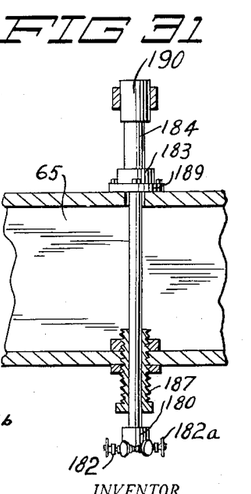
Fig. 31 is a partial vertical section showing the spinning head.
Figure 32:
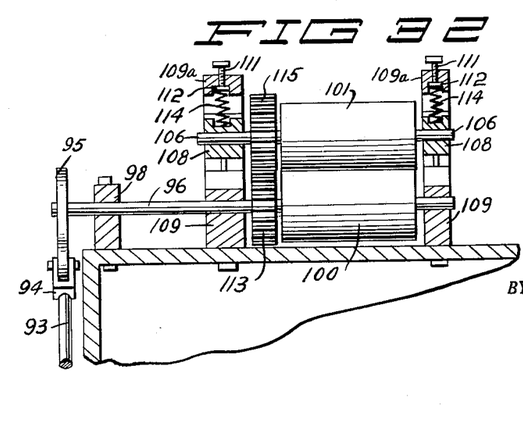
Fig. 32 is a partial vertical section showing the paper feed rolls.

After the container is crimped and sealed, table 134 makes another movement and brings the container to position G. At this time the lower ball 157 (see Figs. 15 and 16) rides up on the raised cam 142b and this raises the outer end of lever 150 causing the same to move the spinning member 144 upwardly against the pressure of spring 147. All of the spinning heads 144 are driven by belt 141 which moves in grooves 144a. The spinning heads are thus constantly rotated at fairly high speed. Belt 141 moves in the grooves of pulleys 143, as described. Belt 141 passes around a driving pulley 146 secured to shaft 147. (See Figs. 13 and 24.) The cam 142b raises pin 155 and thus the spinning member 144 during the crimping operation. As the table is then moved, the spinning member 144 continues to operate on the lower end of the container and the lower end 235b of the container is turned outwardly by the pins 146 as shown at 235b in Fig. 30. The container is kept from rotating by the fact that it is still engaged by the inner segments of the wrapping cage. When lower ball 157 rides down off of the raised portion 142b, spring 147 moves the spinning member 144 downwardly to its normal position. The operations on the container are now completed. The rollers 170z now move outwardly as cam surface 174c increases in its distance from the edge of table 134. The section 170k carrying electrode 170aa swings outwardly, as shown in Fig. 13. The rollers 170n now engage the upper and lower portions of the inner cam so that the container is still held against the mandrel 137 to prevent rotation while the lower end is being turned. Rollers 170n then begin to move along the substantially straight portion of the inner cam shown at the right-hand side thereof in Fig. 13 and this allows the section 170k carrying said rollers to move away from the mandrel and container. Rollers 170z continue to move along the receding surface 174c so that the inner sections 170j now move away from the container and mandrel. The arm 170v and its roller 170w are provided to engage the rim 174c of cam 174 and later portion 170e to give a snubbing effect and to prevent a too rapid movement of the outer section carrying the electrode away from the container and mandrel. As the table makes its next movement, rollers 170n move further toward the center of shaft 130 and the section 170k carrying said rollers and the adjacent sections 170j move out of contact with the container. The section 170k carrying the electrode and the adjacent section 170j have now moved quite a distance away from the container, as shown at station H. The roller 170w engages the projection 174e and prevents the section 170k carrying the electrode from suddenly snapping outwardly. When roller 170w moves off of projection 174e, said outer section moves outwardly to its full outward position, as shown in Fig. 8. When the container has reached station H, the opening 134a comes into alinement with tube or conduit 163. Air under pressure is then blown through opening 134a into passage 139a, into the bore in rod 161, through the openings 161a, into chamber 137b and then through passages 137c. This air moves the container rapidly upwardly off of the mandrel 137 and the container is discharged at one side of the machine. The table now makes another movement and the mandrel 137 described moves into station A where another blank 235 is fed between the mandrel and the wrapping cage.

The different steps of the operation and the form the container takes after each step, is illustrated in Figs. 26–30. The container when finished has its open end nicely turned over at 235b, see Fig. 30, so as to receive a closing lid. The cup-shaped member placed in the container at the top of the mandrel constitutes the bottom of the container when in use and this bottom is very tightly and firmly secured in the container, and not only is so secured, but is sealed in position. The edge portions of the container which overlap are very tightly sealed. A waterproof container is thus provided which is not only made tight by the inter-engagement of the parts but is tightly sealed against any leakage. The lacquer used is a waterproof compound and a tight and waterproof container is thus produced. The strip 170hh of silicon rubber engages the outer layer of the blank and prevents any sticking to the blank and any discoloration.

Should the container for any reason not be blown from the mandrel in position H when the table moves to bring the mandrel into the first or A position, the top of the container will engage contact arm 347a of switch 347 and said switch will open the circuit of motor 35 and stop the machine.

Figure 26:
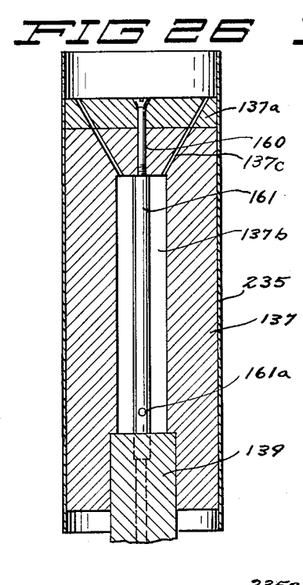
Figs. 26 to 30 inclusive are vertical central sections through the mandrel and container illustrating the different steps in the formation of the container.
Figure 27:
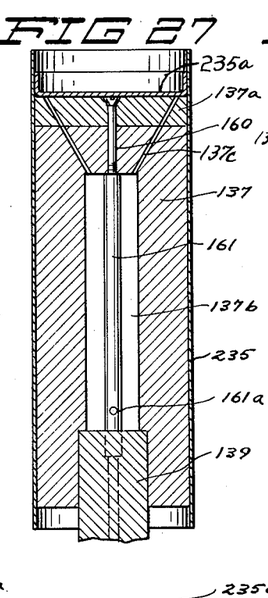

The different stages of operations on the container are illustrated in Fig. 26. As already described, the blank is wrapped around the mandrel with overlapping portions, which overlapping portions are then sealed. At the next position, as shown in the second view in Fig. 26, the closing end is placed in the container. At the next position the spinning head comprising rollers 182 turns the end of the container over the flange of the closing disk and both are rolled inwardly. At the next station the rolled in inter-engaging portions of the closing disk and container are tightly pressed together and sealed. The bottom or open end of the container is then rolled outwardly at its edge, as shown in the last view at the right of Fig. 26.

From the above description it will be seen that I have provided a highly efficient method and apparatus for producing a sealed and waterproof container with great rapidity. The machine operates rapidly and the containers will be produced at a speed of about 120 per minute. The method and apparatus have been amply demonstrated in actual practice, found to be very successful and efficient and the machine will soon be in commercial production.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. An apparatus for making a container having in combination, a substantially horizontal table rotatable about a substantially vertical axis, a plurality of circumferentially and equally spaced mandrels secured to and upstanding from said table, means for intermittently rotating said table the distance between centers of adjacent mandrels, a wrapping cage secured to and upstanding from said table adjacent each of said mandrels, each cage comprising a central vertical standard disposed in close proximity to said mandrel and a pair of hingedly connected swinging sections at each side thereof having surfaces adapted to fit about and enclose said mandrels respectively, cam rollers carried by the outermost ones of said sections respectively, means for feeding a flat blank downwardly between each mandrel and its cage at a certain position, a cam at the outer side of said mandrels extending partially around said table, an inner cam at the inner side of said mandrels extending partially about said table, said cams being adapted to be respectively engaged by said cam rollers in the movement of said table to cause said sections to enclose said mandrels successively and wrap said blanks about said mandrels successively.

2. An apparatus for making a container having in combination, a rotatable table, a plurality of equally and circumferentially spaced mandrels secured to said table and upstanding therefrom, a wrapping cage secured to said table adjacent each of said mandrels, each cage comprising swinging sections having surfaces adapted to fit about and enclose its mandrel, means for intermittently rotating said table, means for feeding a blank between each mandrel and its cage at a certain position, means engaging said sections in the movement of said table to wrap said blank about said mandrel so that said blank has overlapping edge portions extending along one side of said mandrel, means for sealing said overlapping edge portions, means at one position of said table for forming and placing a flanged closing member in one end of said wrapped blank, means at another position of said table for folding the top edge of said container over the flange of said closing member, means at another station of said table for crimping said folded over portion and said closing member together, means for sealing said closing member and container together, means for turning outwardly the bottom end of said container as it is positioned on said mandrel, and means for discharging said containers from each of said mandrels at another position of said table.

3. An apparatus for making a container having in combination, a horizontal rotatable table, a plurality of circumferentially spaced mandrels secured to and upstanding from said table, a wrapping cage secured to said table adjacent each of said mandrels, said cage having a central standard disposed in close proximity to said mandrel and a pair of swinging sections at each side thereof having surfaces adapted to fit about and enclose its mandrel, means for intermittently rotating said table the circumferential distance between the centers of said mandrels, means for feeding a blank of flat sheet material downwardly between each mandrel and its cage at a certain position of said table, means engaging said sections in the movement of said table for wrapping said blank about said mandrel so that said sheet has overlapping edge portions, an electrode carried by one of said sections movable with said section into contact with said overlapping edge portions as said sections enclose said mandrel, and means for passing a current through said electrode for sealing said overlapping edge portions.

4. An apparatus for making a container having in combination, a rotatable table, a plurality of equally and circumferentially spaced mandrels secured to and upstanding from said table, a wrapping cage secured to said table adjacent each of said mandrels and comprising swinging sections having surfaces adapted to fit about and enclose said mandrels respectively, means for intermittently moving said table, means for feeding a blank between each mandrel and its cage at one position of said table, means for swinging said sections to cause the same to enclose said mandrels respectively and wrap said blanks about said mandrels, a spinning member carried by said table below each of said mandrels and in axial alinement therewith, and means for rotating all of said spinning members and means for raising said spinning members respectively at a certain position to reversely bend the lower portion of said container.

5. An apparatus for making a container having in combination, a movable member, a mandrel secured to and upstanding from said member, a wrapping cage secured to said member adjacent said mandrel, said cage comprising a central upstanding standard, a member extending through said standard and extending substantially radially of said mandrel, a pair of oppositely disposed sections pivoted to said member, a pair of sections pivotally connected respectively to the outer ends of said sections, means for feeding a blank between said mandrel and cage, resilient means for moving said member against said standard in a direction away from said mandrel, means for moving said first mentioned member, and means engaging said sections in the movement of said first mentioned member for swinging said sections and causing the same to enclose said mandrel and wrap said blank around said mandrel, said last mentioned means exerting a pull on said sections and second mentioned member in the movement of said first mentioned member against the tension of said resilient means to pull said sections against said blank and mandrel to cause said blank to be tightly pressed against said mandrel.

6. An apparatus for making a container having in combination, a rotatable member movable in a horizontal plane, a plurality of mandrels secured to and upstanding from said member, a wrapping cage secured to said member adjacent each of said mandrels, means for feeding a blank between each of said mandrels and its respective cage at a certain position, said wrapping cage comprising a central standard and a pair of hingedly connected swinging sections pivoted thereto at each side thereof having surfaces adapted to fit about and enclose said mandrel, spaced cam tracks at substantially opposite sides of said mandrels engaged by said rollers for causing said sections to enclose said mandrel and wrap said blank about said mandrels respectively in the movement of said member, a cross-head disposed above said table, said cross-head carrying a plurality of spaced elements for acting on said blank in the successive movements of said member, and means for reciprocating said cross-head.

7. An apparatus for making a container having in combination, a movable member disposed in a horizontal plane, a mandrel secured to said member and extending vertically therefrom, a wrapping cage secured to said member adjacent said mandrel, said cage comprising a plurality of swinging sections having surfaces formed to fit about and enclose said mandrel, resilient means for swinging said sections away from said mandrel, means for moving said movable member, means for feeding a blank of flat sheet material downwardly between said mandrel and cage, means for swinging said sections to enclose said mandrel and wrap said blank about said mandrel and hold said sections in said enclosing positions, said blank being wrapped about said mandrel so as to have overlapping edge portions, an electrode carried by one of said sections movable to position to engage said blank and overlie said overlapping edge portions as said section is moved about said mandrel, and means for passing an electric current through said electrode as said movable member moves to heat and seal said overlapping portions.

8. The method of making a container which consists in providing a substantially rectangular blank of heavy flexible paper, coating both sides of said paper with a waterproof substance adapted to form an adhesive when heated, providing a mandrel, disposing said blank at one side of said mandrel with its surface parallel to said side, moving said mandrel, wrapping said blank about said mandrel as the latter is moving so that said blank is formed into a cylindrical member having overlapping edge portions, heating said edge portions as said mandrel moves to seal said container, forming a cup-shaped closing member having a peripheral flange, inserting the same in one end of said cylindrical member with said flange directed towards said end and engaging the inside of said cylindrical member, spinning the edge of said blank and flange inwardly and crimping said flange and blank and forming a multiplicity of ribs and grooves therein extending longitudinally thereof and sealing said crimped portions together.

9. An apparatus for making a container having in combination, a rotatable horizontal table, eight circumferentially spaced mandrels carried by and extending vertically from said table, means for intermittently moving said table the distance between adjacent mandrels to successive positions, a cage carried by said table closely adjacent each of said mandrels, said cage comprising a central standard and a plurality of hingedly connected swinging sections at each side thereof, rollers carried by certain of said sections at the outer sides thereof respectively, means for feeding a blank of flat sheet material downwardly between a cage and its adjacent blank at one of said positions, cams at the inner and outer sides of said mandrels engaged respectively by said rollers for causing said sections to swing toward said mandrel and fold said blank tightly about said mandrel at a subsequent position with the edge portions of said blank overlapping, means for applying heat to said overlapping portions at the last mentioned position and the next subsequent position, means at a subsequent position for forming a cup-shaped end member and moving the same into the upper end of said wrapped blank, and means at another subsequent position movable downwardly to turn the end of said blank downwardly over said flange.

10. The structure set forth in claim 9, and means at another subsequent position for crimping said overturned portion and flange tightly together and sealing the same.

11. The structure set forth in claim 10, and means at another subsequent position for reversely bending the bottom of said wrapped blank.

12. The structure set forth in claim 10, and means at still another subsequent position for removing said blank from said mandrel.

13. An apparatus for making a container having in combination, a movable member disposed in a horizontal plane, a mandrel secured to said movable member and upstanding therefrom, a wrapping cage secured to said member adjacent said mandrel, said cage comprising a plurality of swinging sections having surfaces adapted to fit about and enclose said mandrel, resilient means for swinging said sections away from said mandrel, means for moving said movable member, means for fitting a blank of flat sheet material between said mandrel and cage, said sheet having a coating thereon adapted to form an adhesive when heated, means for swinging said sections to enclose said mandrel and wrap said blank about said mandrel and hold said sections in said enclosing position, said blank being wrapped about said mandrel so as to have overlapping edge portions, an electrode carried by one of said sections movable to position to engage said blank and overlie said overlapping edge portions, and means for passing a current through said electrode as said member moves to heat and seal said overlapping portions.

14. The method of making a container which consists in providing a substantially rectangular blank of heavy paper, coating both sides of said paper with a waterproof substance adapted to form an adhesive when heated, providing a mandrel disposing said blank at one side of said mandrel with its surface parallel to one side of said mandrel, moving said mandrel, wrapping said blank about said mandrel as the latter is moving so that said blank is formed into a cylindrical member having overlapping edge portions, heating said edge portions to seal the same together, forming a cup-shaped closing member having a peripheral flange projecting outwardly and engaging the inside of said wrapped blank, spinning the edge of said blank and flange inwardly and forming a multiplicity of adjacent rib-forming grooves therein extending longitudinally of said container so that said grooves and ribs are interfitting in said blank and flange and then sealing said spun over portions together.

15. An apparatus for making a container having in combination, a mandrel, means for moving said mandrel in a circular path, a wrapping device, said wrapping device comprising a supporting member, a pair of sections pivoted to said member and extending in opposite directions therefrom, a second pair of outer sections respectively pivotally secured to the remote ends of said first mentioned sections and extending outwardly in opposite directions therefrom so that said sections are positioned substantially in transverse alinement, resilient means holding said sections in said positions, said sections having surfaces at one side thereof adapted to fit about and enclose said mandrel, rollers on one of said outer sections spaced longitudinally thereof, a plurality of adjacent axially alined rollers on the other of said outer sections, and tracks at substantially opposite sides of said mandrels respectively engaging said rollers.

16. An apparatus for making a container having in combination, a substantially horizontal movable member, a plurality of vertically extending spaced mandrels carried by said member, a wrapping cage secured to said movable member in close proximity to each of said mandrels and disposed in a vertical plane substantially parallel to the axis of the adjacent mandrel, said cage comprising a central standard and a plurality of swingable sections at each side thereof having surfaces formed to fit about said mandrel so as to enclose the same, rollers on certain of said sections, means for feeding a flat blank downwardly between each mandrel and cage at a certain position of said member, cams disposed at substantially opposite sides of said mandrels for engaging said rollers on said sections respectively as said member is moved for causing said sections to enclose said mandrels and successively wrap said blanks about said mandrels.

17. The structure set forth in claim 15, a holder secured to the outer end of one of said last mentioned sections and extending longitudinally thereof, an electrode secured to said holding member spaced from the end of said section and extending longitudinally throughout the length of said section, said electrode having means for the attachment of an electrical conductor thereto.

18. The structure set forth in claim 17, said holder being made of silicon fiber glass, said electrode being cast about the end of said holder and being made of aluminum, and a conductor extending longitudinally through said electrode and being made of a material having a high conductivity for an electric current.

19. The structure set forth in claim 18, said conductor being made of metal having highly magnetic permeability, a sheathing of an insulating silicate about said conductor and a sheathing of metal having high magnetic permeability about said sheathing.

20. The structure set forth in claim 17, said electrode having an operative face at one side thereof and a comparatively thin layer of silicon rubber overlying and secured to said face.

21. The structure set forth in claim 20, said layer of rubber having a multiplicity of small holes extending therethrough.

References Cited in the file of this patent

UNITED STATES PATENTS

| | | |
|---|---|---|
| 1,077,496 | Taylor | Nov. 4, 1913 |
| 1,962,983 | Cooley | June 12, 1934 |
| 2,049,418 | Barbieri | Aug. 4, 1936 |
| 2,106,739 | Harrison | Feb. 1, 1938 |
| 2,168,543 | Vergobbi | Aug. 8, 1939 |
| 2,386,787 | Geertsen | Oct. 16, 1945 |

FOREIGN PATENTS

| | | |
|---|---|---|
| 421,742 | Great Britain | Dec. 31, 1934 |
| 518,563 | Great Britain | Mar. 1, 1940 |